Figure 3:
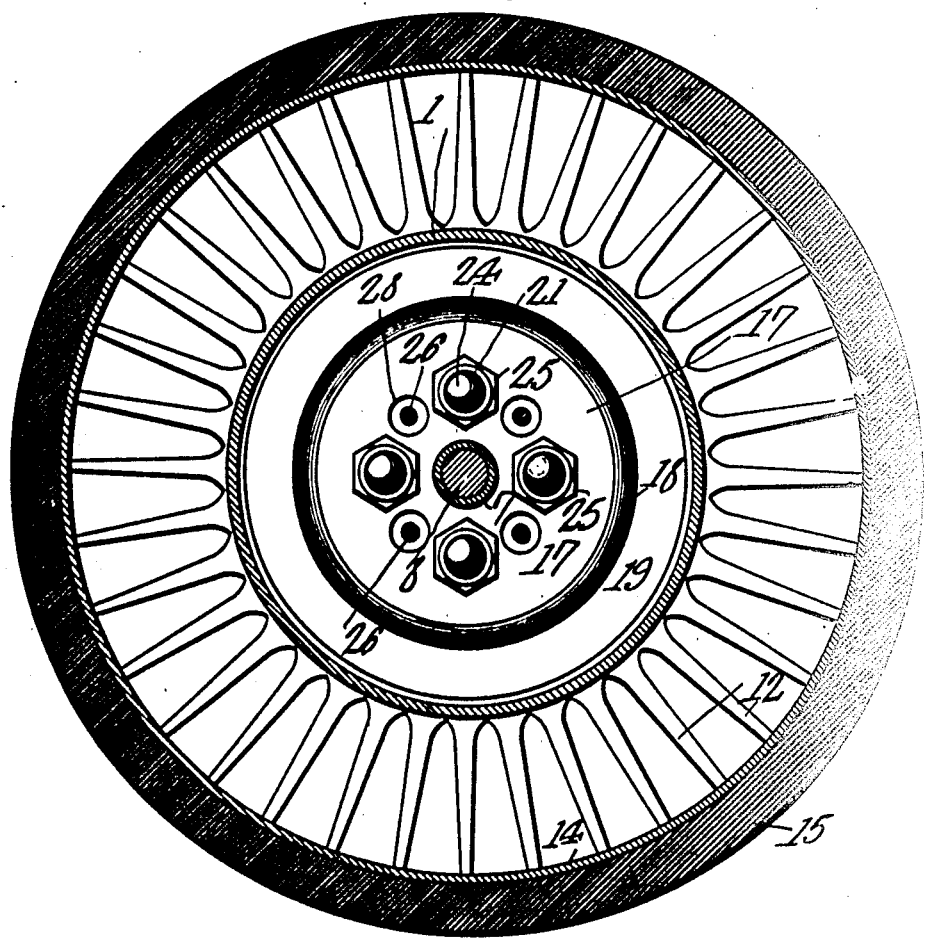

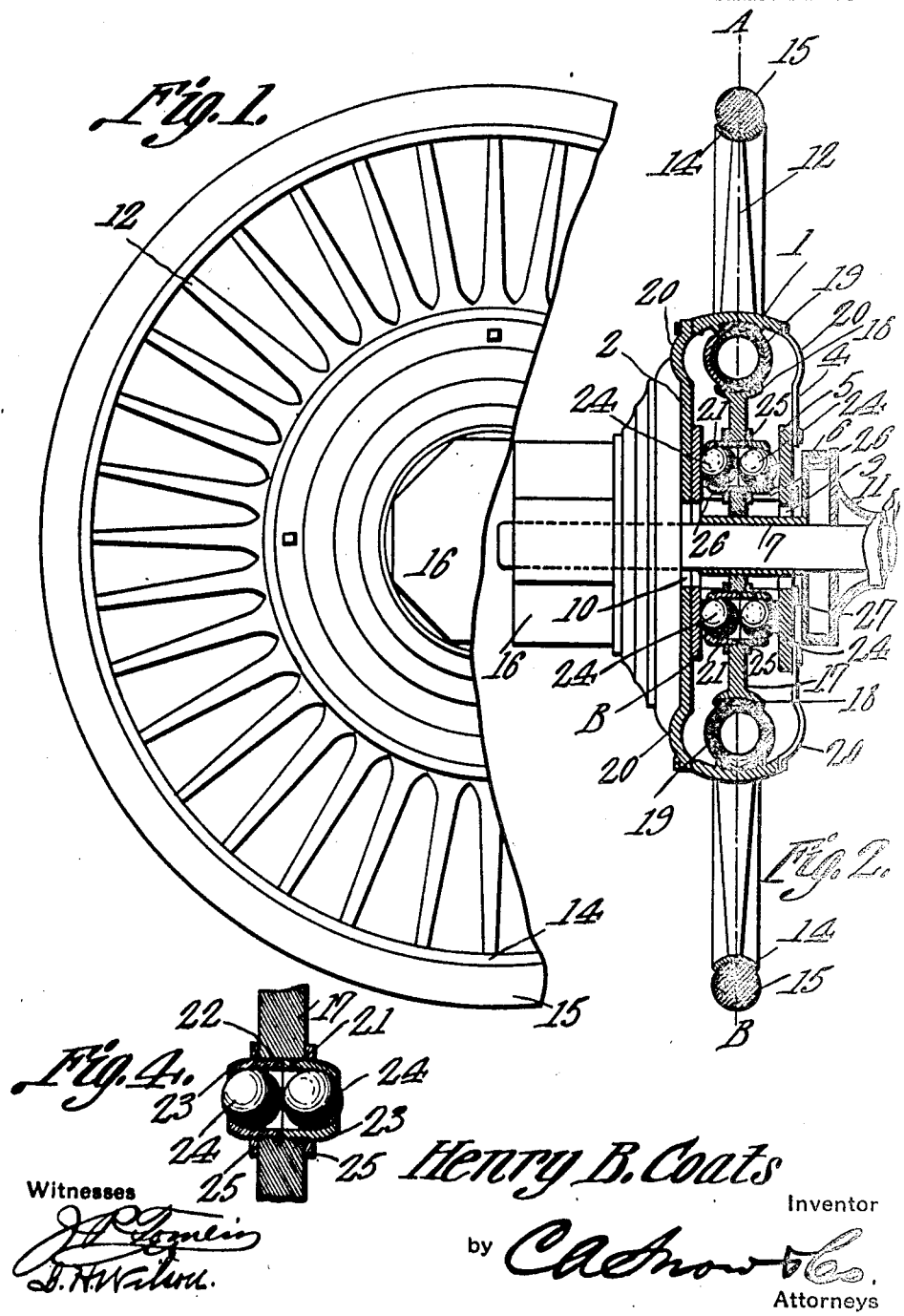

H. B. COATS.
AUTOMOBILE WHEEL.
APPLICATION FILED AUG. 29, 1911.

1,040,511.

Patented Oct. 8, 1912.
2 SHEETS—SHEET 2.

Witnesses

Henry B. Coats
Inventor
by C. A. Snow
Attorneys

UNITED STATES PATENT OFFICE.

HENRY B. COATS, OF VEEDERSBURG, INDIANA.

AUTOMOBILE-WHEEL.

1,040,511.   Specification of Letters Patent.   Patented Oct. 8, 1912.

Application filed August 29, 1911. Serial No. 646,692.

*To all whom it may concern:*

Be it known that I, HENRY B. COATS, a citizen of the United States, residing at Veedersburg, in the county of Fountain and State of Indiana, have invented a new and useful Automobile-Wheel, of which the following is a specification.

It is the object of the present invention to provide a vehicle wheel, the pneumatic element of which is housed within the hub, whereby such element may be protected from injury.

A further object of the invention is to provide a novel means for mounting a pneumatic element within the hub, and to provide anti-friction elements of novel and improved construction, operating to lessen the friction between certain component members of the structure.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 is a fragmental side elevation of a wheel constructed in accordance with the present invention. Fig. 2 is a diametral section of the structure appearing in Fig. 1; Fig. 3 is a section upon the line A—B of Fig. 2; and Fig. 4 is a section of one of the ball cages, together with a portion of the supporting member in which the ball cages are mounted.

In carrying out the invention there is provided a casing 1, having a side wall 2. Attached to the inner face of the side wall 2 is a bearing plate 3. Removably secured to the open, inner side of the casing 1, is an annular closure member 4, to which is secured a bearing plate 5, positioned opposite to the bearing 3.

A brake drum 6 is shown, the same having a tubular extension 7 through which extends an axle 8, the same being secured together for simultaneous rotation. In the bearing plate 5 there is an opening 9 and in the side wall 2 of the casing and in the bearing plate 3 there are openings 10. The openings 9 and 10 are of sufficient size so that the casing may have movement upon the axle 8, transversely of the same, without striking the axle or the extension 7 of the brake drum. A cover 11 for the brake drum is provided, the cover 11 being supported from the vehicle frame in any common or well known manner.

The casing 1 carries spokes 12, the spokes supporting the rim 14, and the rim carrying the tire 15, it being understood that the rim 14 and the tire 15 may be of any desired form. A cap nut 16 is provided for the axle 8, as clearly shown in Fig. 2.

The invention further includes a supporting member, taking the form of a plate, which supporting member or plate 17 is located within the casing 1, between the bearing plates 3 and 5. The supporting member 17 is attached to the extension 7 of the brake drum 6, so that the supporting member will receive a drive directly from the axle 8, the braking effect of the drum 6 being applied to the wheel through the supporting member or plate 17. The supporting member 17 is peripherally equipped with a rim 18, carrying a tire 19, preferably an inflatable pneumatic tire, the tire bearing against the periphery of the casing 1, the casing 1 being adapted to receive the tire. The side wall 2 of the casing and the closure member 4 are convexed outwardly, as shown at 20, so as to permit the tire 19 to expand without striking the casing or the closure member.

The invention further includes a plurality of ball cages, one of which is shown clearly in Fig. 4. Each ball cage consists of separate members 21, of tubular form, these members 21 being threaded at their inner ends, as shown at 22, to engage with the supporting member 17. The ends of the members 21 are contracted as shown at 23, to retain the balls 24 in the ball cages. The balls 24, however, extend beyond the ends of the ball cages, so as to bear anti-frictionally against the plates 3 and 5. The balls 24 engage with each other, adjacent the median plane of the wheel. The members 21 of the cages may be further held in place within the supporting member 17 by means of nuts 25 which are threaded upon the members 21 of the ball cages, the nuts engaging opposite faces of the supporting member 17.

The bearing plate 3 is equipped with inwardly projecting studs 26, extended through the bearing plate 5, there being nuts 27 upon the studs 26, the nuts 27 engaging the exposed face of the plate 5. Referring particularly to Fig. 3 it will be seen that there are openings 28 in the supporting member 17, through which openings studs 26 pass. The diameter of these openings 28 is much greater than the diameter of the studs 26.

It will be noted that the axle 8 serves as a support for the member 17, the member 17 carrying a tire 19, and the tire 19 supporting a casing 1 yieldingly. Relative movement between the casing 1 and the member 17 is possible, because of the size of the openings 10 and 9, as compared with the diameter of the axle, and because of the fact that, as shown in Fig. 3, the openings 28 in the supporting member 17, are much greater than the diameter of the studs 26 which pass through these openings.

The drive, and the braking effort, are applied directly to the supporting member 17, and should the pneumatic tire 19 fail, the studs 26 will still afford an operative connection between the casing 1 and the axle 8, whereby the driving of the wheel may be continued. Obviously, relative movement between the supporting member 17 and the casing is facilitated, owing to the fact that the balls 24 bear against the plates 3 and 5. Moreover, as the ball cage is contracted at its ends, as shown at 23, the balls 24 will be prevented from having movement longitudinally of the ball cage. Therefore, although the balls exercise their proper functions as antifriction elements, they may, at the same time, engage with the plates 3 and 5 to prevent the wheel from moving transversely of the axle 8 with a "wabbling" motion, when the wheel is rotating.

Having thus described the invention, what is claimed is:—

1. A wheel comprising a supporting member adapted to be secured to an axle; an inclosing structure about the supporting member and adapted to have movement transversely of an axle; resilient means for limiting the movement of the inclosing structure transversely of the axle; a series of rotatable anti-friction elements bearing upon spaced parts of the inclosing structure, said parts of the inclosing structure constituting means for maintaining the anti-friction elements in contact with each other transversely of the wheel; and means in the supporting member for holding the anti-friction elements against movement transversely of the wheel, whereby the anti-friction elements will prevent lateral movement of the inclosing structure with respect to the supporting member.

2. A wheel comprising a supporting member adapted to be secured to an axle; an inclosing structure surrounding the supporting member and adapted to have movement transversely of an axle; ball cages comprising separable parts threaded into the supporting member at their inner, meeting ends, and extended through the supporting member transversely of the same; balls in the ball cages, the ball cages being contracted at their ends to prevent the balls from moving transversely of the supporting member, the balls engaging the inclosing structure on both sides of the median plane of the wheel; and a pneumatic tire carried by the periphery of the supporting member and engaging the inclosing structure.

3. A wheel comprising a supporting member adapted to be secured to an axle; an inclosing structure surrounding the supporting member and adapted to have movement transversely of an axle; securing elements uniting opposite points on the inclosing structure, the securing elements being movable in enlarged openings in the supporting member; ball cages mounted in the supporting member transversely of the same and comprising separable parts the meeting ends of which are threaded into the supporting member; nuts upon the ball cages and engaging the supporting member to reinforce the same between the openings and to hold the parts of the cages against rotation in the supporting member; balls in the ball cages, the ends of the ball cages being contracted to prevent the balls from moving longitudinally in the ball cages, the balls being adapted to engage the inclosing structure upon opposite sides of the median plane of the wheel and to engage each other adjacent the median plane of the wheel; and a tire carried by the periphery of the supporting member and engaging the inclosing structure.

In testimony that I claim the foregoing as my own, I have hereto affixed my signature in the presence of two witnesses.

HENRY B. COATS.

Witnesses:
 FRANK B. OCHSEMEILER,
 LENA WILLSON.